(12) United States Patent
Kim

(10) Patent No.: US 11,919,398 B2
(45) Date of Patent: Mar. 5, 2024

(54) VEHICLE COCKPIT MODULE ASSEMBLY

(71) Applicant: HYUNDAI MOBIS Co., Ltd., Seoul (KR)

(72) Inventor: Won Sik Kim, Hwaseong-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 372 days.

(21) Appl. No.: 17/502,662

(22) Filed: Oct. 15, 2021

(65) Prior Publication Data

US 2022/0134883 A1 May 5, 2022

(30) Foreign Application Priority Data

Oct. 15, 2020 (KR) .......................... 10-2020-0133667

(51) Int. Cl.
*B60K 37/02* (2006.01)
*B60K 37/04* (2006.01)

(52) U.S. Cl.
CPC .............. *B60K 37/02* (2013.01); *B60K 37/04* (2013.01); *B60K 2370/152* (2019.05); *B60K 2370/40* (2019.05); *B60K 2370/67* (2019.05); *B60K 2370/744* (2019.05); *B60K 2370/84* (2019.05)

(58) Field of Classification Search
CPC .. B60K 37/02; B60K 37/04; B60K 2370/152; B60K 2370/40; B60K 2370/67; B60K 2370/744; B60K 2370/84; B60K 37/00; B60K 35/00; B60R 2011/0043; B60R 2011/0084; B60R 2011/0092; B60R 11/0235; B60R 11/02; B60R 2011/0005; B60R 11/0229; F16H 7/02; B62D 25/14; B62D 25/145

USPC ...................................................... 296/70, 72
See application file for complete search history.

(56) References Cited

U.S. PATENT DOCUMENTS

| | | | |
|---|---|---|---|
| 9,415,688 B2 | 8/2016 | Hagiwara et al. | |
| 9,662,978 B2* | 5/2017 | Sprickmann Kerkernick | ............. B60K 35/00 |
| 10,766,365 B2 | 9/2020 | Pegorier et al. | |
| 11,091,109 B1* | 8/2021 | Patel | ....................... B60R 21/02 |

(Continued)

FOREIGN PATENT DOCUMENTS

| | | | |
|---|---|---|---|
| DE | 10 2004 044 163 B3 | 4/2006 | |
| DE | 102004044163 B3 * | 4/2006 | ............. B60K 35/00 |

(Continued)

*Primary Examiner* — Amy R Weisberg
*Assistant Examiner* — Sara Laghlam
(74) *Attorney, Agent, or Firm* — NSIP Law

(57) ABSTRACT

A vehicle cockpit module assembly disposed inside a dashboard for a vehicle and including a dashboard connection frame inserted into a bent inner side surface of an upper dashboard and including a structure insertion groove for insertion disposed at one extended side; a rail assembly including a main housing to accommodate a linear power transmitting portion, which includes a pulley and a timing belt and a fixing bracket coupled to one side of the main housing, the fixing bracket inserted into the structure insertion groove of the dashboard connection frame, and including a sliding hole formed to allow horizontal sliding of a monitor; and a connection frame fastened to the linear power transmitting portion, which is disposed inside the main housing, through the sliding hole and fastened to the monitor to allow the monitor to slide in the sliding hole due to the linear power transmitting portion.

11 Claims, 21 Drawing Sheets

(56) References Cited

U.S. PATENT DOCUMENTS

2014/0320768 A1* 10/2014 Hagiwara ........... B60R 11/0229
349/12
2015/0008299 A1* 1/2015 Lee ....................... B60K 37/04
248/286.1

FOREIGN PATENT DOCUMENTS

| DE | 10 2011 000 924 A1 | | 8/2012 | | |
|----|---|---|---|---|---|
| DE | 102011000924 A1 | * | 8/2012 | ............. | B60R 11/02 |
| JP | 5921173 B2 | | 5/2016 | | |
| KR | 20120134900 | * | 12/2021 | ............. | B60D 25/14 |
| WO | WO-9407733 A1 | * | 4/1994 | ........... | B60H 1/0055 |

* cited by examiner

<DRIVER MODE>

<PASSENGER MODE>

600: 610, 630

VEHICLE COCKPIT MODULE ASSEMBLY

CROSS-REFERENCE TO RELATED APPLICATION

This application claims priority to and the benefit of Korean Patent Application No. 10-2020-0133667, filed on Oct. 15, 2020, the disclosure of which is incorporated herein by reference in its entirety.

BACKGROUND

1. Field of the Invention

The present invention relates to a vehicle cockpit module assembly, and more particularly, to a cockpit module assembly for sliding of a monitor mounted in a vehicle.

2. Discussion of Related Art

Generally, a center fascia display device which displays Audio Video Navigation (AVN) functions, navigation functions, and air conditioning control functions of a vehicle to a driver to allow the driver to control such functions is mounted in a fixed state on a dashboard of the vehicle.

However, in a case in which individual components of a vehicle are separately produced and assembled together, there is a problem in that the assembly process becomes complex.

In order to address such a problem, individual components such as electronic components including an instrument panel, a cross bar, an air conditioning system, an airbag, various instrument panels, and an audio, a steering column and steering wheels, and a pedal assembly are supplied to automakers in an assembled state, that is, in sliding monitor module assembly (cockpit module) units.

In a case in which the individual components are supplied in sliding monitor module assembly units to automakers as described above, it is possible to maximize the efficiency of design work.

In the case of a mobile type monitor that is applied to the sliding monitor module assembly, despite being able to maintain device robustness through an assembly structure, there is a problem in that a separate structure is required to withstand a load relating to a load caused by an external force of an operating part. That is, in the case of the mobile type monitor, there is a problem in that, when an abnormal external force occurs in a state in which the monitor is fixed or moving, damage occurs to a connecting portion of the monitor that is fixed or moving.

Also, the conventional sliding moving monitor has a problem in that a sliding structure requires securing as much space as a moving distance thereof as it moves, thus causing a movement trajectory of the monitor to be exposed in the form of a slit on an exterior and having the possibility of degrading operability due to the exterior and foreign substances.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a vehicle cockpit module assembly, which is disposed inside a dashboard for a vehicle, includes: a dashboard connection frame inserted into a bent inner side surface of an upper dashboard and including a structure insertion groove for insertion disposed at one extended side thereof; a rail assembly including a main housing configured to accommodate a linear power transmitting portion, which includes a pulley and a timing belt and a fixing bracket coupled to one side of the main housing, the fixing bracket being configured to be inserted into the structure insertion groove of the dashboard connection frame, and including a sliding hole formed at one side to allow horizontal sliding of a monitor; and a connection frame having one side thereof fastened to the linear power transmitting portion, which is disposed inside the main housing, through the sliding hole and the other side thereof fastened to the monitor to allow the monitor to slide in the sliding hole due to the linear power transmitting portion.

The dashboard may include: the upper dashboard, which is a body front end assembly constituting a front vertical plane of a body; and a lower dashboard, which is assembled to the upper dashboard to form a partition that divides a front body and an interior of the vehicle, and when the upper dashboard and the lower dashboard are assembled, a sliding space for horizontal sliding of the connection frame may be formed between the upper dashboard and the lower dashboard.

The upper dashboard may include a bent portion having a longitudinal end that is bent and extended.

In the dashboard connection frame, a bent portion which has a same shape as the bent portion of the upper dashboard may be formed, and the structure insertion groove may be formed at one side of the dashboard connection frame extending from the bent portion of the dashboard connection frame.

The linear power transmitting portion may include a timing belt clip, and the fixing bracket may be fastened to the one side of the main housing and inserted into the structure insertion groove of the dashboard connection frame to fasten the main housing.

In the fixing bracket, a hole for allowing horizontal movement of the connection frame may be formed.

A guide rail configured to guide horizontal movement of the connection frame may be disposed in the fixing bracket, and a sliding portion configured to slide while inserted into the guide rail may be disposed in the connection frame.

The connection frame may include a connection bracket that may include: a belt connecting member having one side inserted into the hole of the fixing bracket and connected to the timing belt clip; an extending member extending from one side of the belt connecting member in a direction perpendicular thereto; a lower fixing member disposed at a longitudinal end of the belt connecting member; a support member extending from a longitudinal end of the extending member so as to be bent to be parallel to the upper dashboard or the dashboard connection frame; and a monitor connecting member formed to be bent from a longitudinal end of the support member in a downward direction symmetrical to a gaze of a driver.

The connection frame may include a monitor bracket, and the monitor bracket may include: an upper connecting portion fastened to the monitor connecting member; an extending portion extending from the upper connecting portion; a monitor connecting portion formed in a perpendicular direction from the extending portion so as to be connected to the monitor; and a lower connecting portion extending from the monitor connecting portion so as to be fastened to the lower fixing member.

The vehicle cockpit module may include a garnish module, which may include: an upper garnish formed to be bent inward from an end portion of the upper dashboard; and a lower garnish fastened to one side of the lower connecting portion of the monitor bracket to cover the lower dashboard.

In the upper garnish, an insertion guide hole through which the monitor connecting member of the connection bracket passes may be formed.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the art to which the present invention pertains. The present invention is defined by the scope of the claims. Meanwhile, terms used herein are for the purpose of describing the embodiments and are not intended to limit the present invention. As used herein, the singular forms include the plural forms as well unless the context clearly indicates otherwise. The terms "comprise" and/or "comprising" used herein do not preclude the presence or addition of one or more elements, steps, operations, and/or devices other than stated elements, steps, operations, and/or devices.

Figure 1:
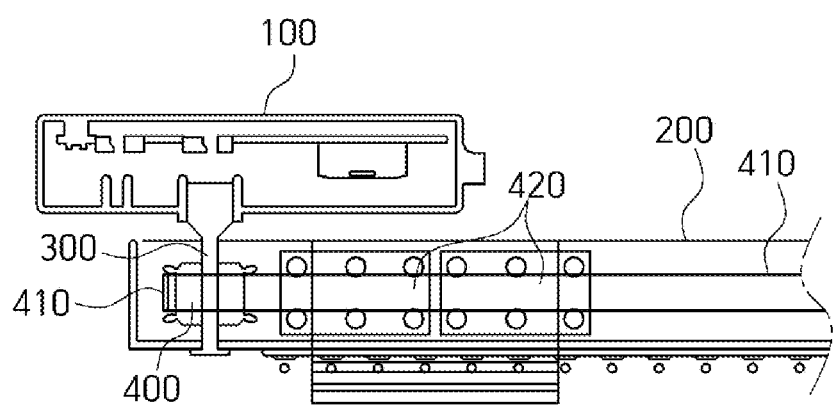
FIG. 1 is a schematic diagram for describing a vehicle cockpit module assembly according to a first embodiment of the present invention.
Figure 2A:
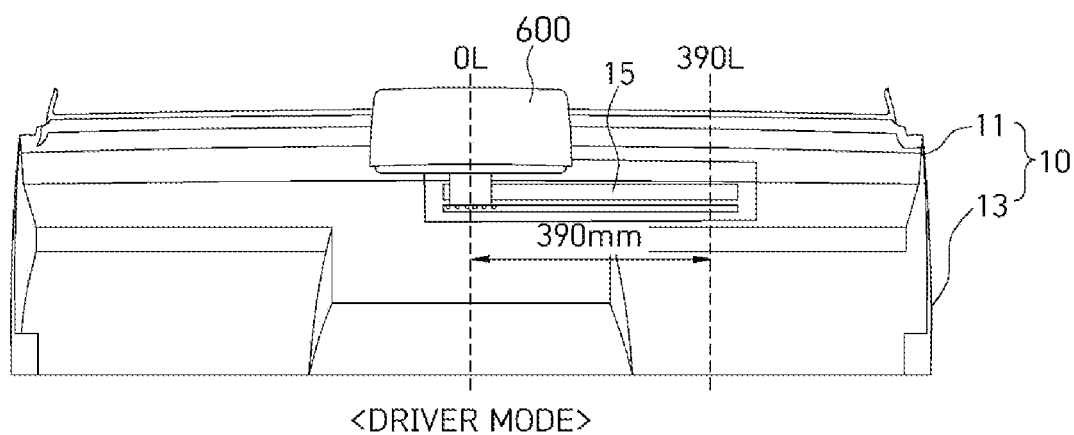
FIGS. 2A and 2B are reference diagrams illustrating a vehicle monitor sliding system to which the vehicle cockpit module assembly according to the present invention is applied.
Figure 2B:
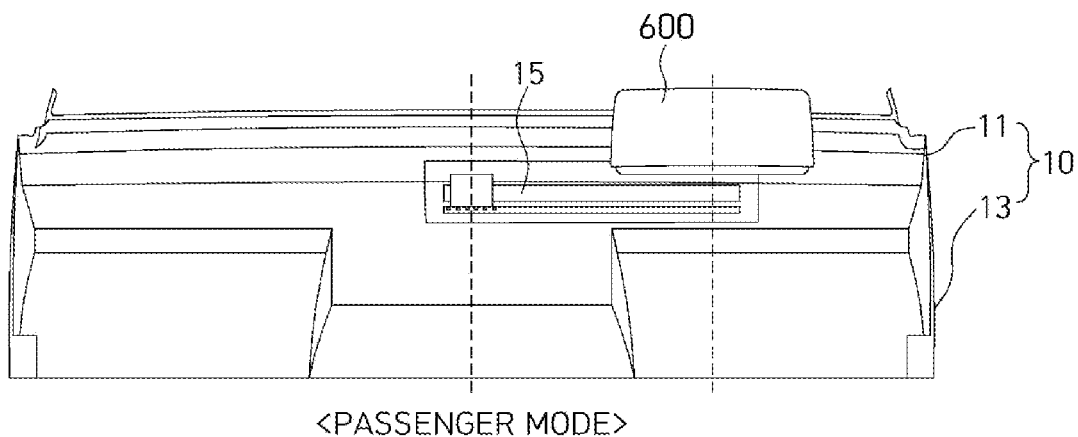
Figure 3:
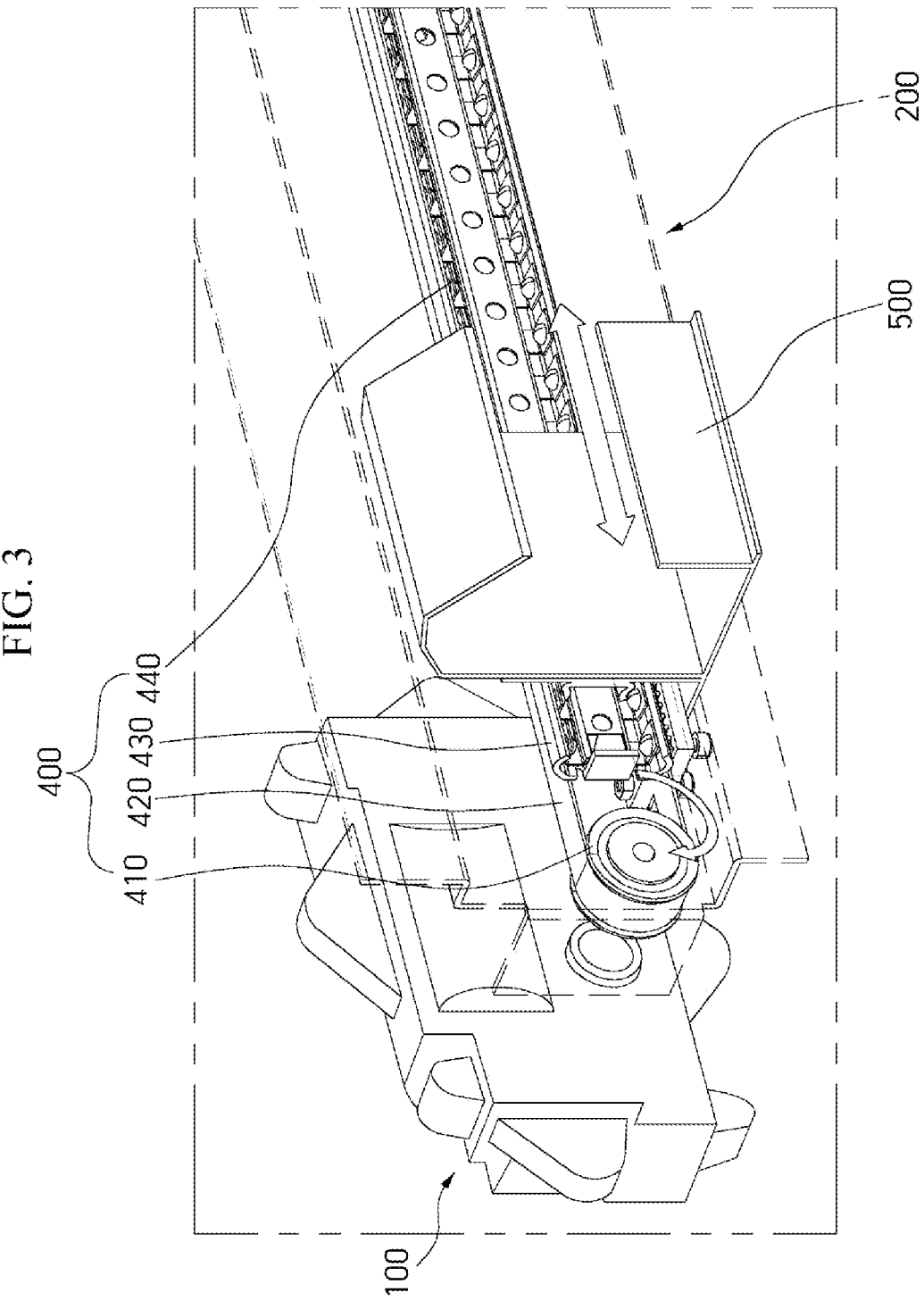
FIG. 3 is a perspective view of a portion of the vehicle cockpit module assembly according to the first embodiment of the present invention.

FIG. 1 is a schematic diagram for describing a vehicle cockpit module assembly according to a first embodiment of the present invention, FIG. 2 is a reference diagram illustrating a vehicle monitor sliding system to which the vehicle cockpit module assembly according to the present invention is applied, and FIG. 3 is a perspective view of a portion of the vehicle cockpit module assembly according to the first embodiment of the present invention.

As illustrated in FIG. 1, a vehicle cockpit module assembly according to an embodiment of the present invention includes an actuator module 100, a main housing 200, a motor 300, a linear power transmitting portion 400, and a connection frame 500 and further includes a slip gear module 800.

The actuator module 100 provides electricity to the motor 300 and is disposed at one side of the main housing 200.

The main housing 200 is disposed inside a dashboard assembly 10 in which an upper dashboard 11 and a lower dashboard 13 are combined. Also, the main housing 200 is disposed inside the dashboard assembly 10 so that the connection frame 500 horizontally slides as illustrated in FIG. 2 using power provided from the actuator module 100 through the motor 300.

The main housing 200 is fixed to an interior of the dashboard assembly 10 to fix the actuator module 100 at one side and accommodates the linear power transmitting portion 400, which includes a pulley 410, a timing belt 420, and a timing belt clip 430, therein while a guide rail 440 of the linear power transmitting portion 400 is disposed outside the main housing 200.

The motor 300 uses the electricity provided from the actuator module 100 to provide a rotational force to the pulley 410 through a motor rotating shaft 310.

Also, as illustrated in FIG. 3, the linear power transmitting portion 400 converts rotary motion applied from the motor 300 into linear motion.

To this end, the linear power transmitting portion 400 may include the pulley 410, the timing belt 420, and the timing belt clip 430 and may further include the guide rail 440.

The pulley 410 is connected to the motor rotating shaft 310 to rotate due to a rotational force applied from the slip gear module 800 through the motor rotating shaft 310 and transmit the rotational force to the timing belt 420 connected thereto.

The timing belt 420 is disposed inside the main housing 200 and has one side connected to the pulley 410 to convert rotary motion applied from the motor rotating shaft 310 into linear motion. Here, the timing belt 420 transmits power applied from the pulley 410 as power that allows the monitor to horizontally move within a range of the main housing 200. Meanwhile, a roller (not illustrated) may be connected to the other end of the timing belt 420.

Here, in order to improve driver or passenger usability of the device according to a use environment, the timing belt 420 may be set to have 390 mm as a horizontal sliding operation distance, but preferably, the horizontal sliding operation distance may vary according to the vehicle model and operation concept.

The timing belt clip 430 has one side fixed to the timing belt 420 to horizontally move inside the main housing 200 according to linear motion of the timing belt 420. Also, the timing belt clip 430 is connected to the connection frame 500.

Also, the guide rail 440 is disposed outside the main housing 200 to guide horizontal sliding when the connection frame 500 moves. To this end, the connection frame 500 may include a sliding portion so that the connection frame 500 may be guided in a state of being inserted into the guide rail 440.

Figure 4:
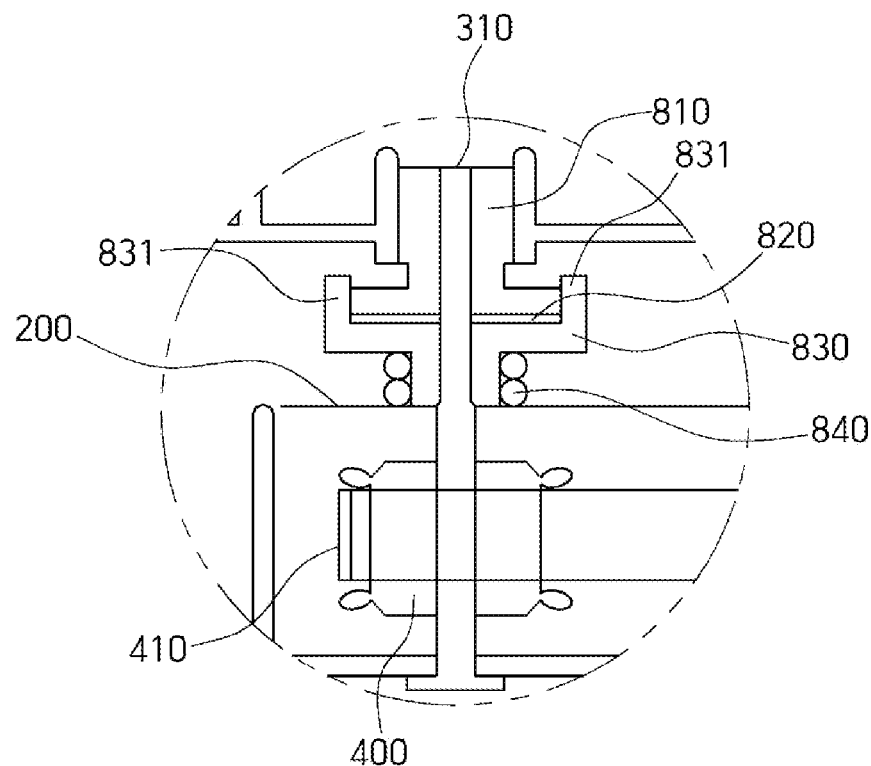
FIG. 4 is an enlarged view for describing movement of a monitor in an embodiment of the present invention.
Figure 5:
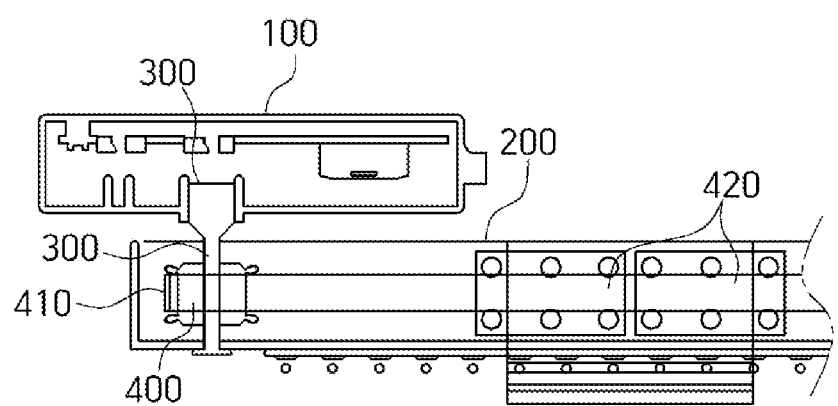
FIGS. 5 to 8 are reference diagrams for describing an operational process of the vehicle cockpit module assembly according to the first embodiment of the present invention.

The connection frame 500 has one side connected to the timing belt clip 430 and the other side connected to the monitor. Thus, as illustrated in FIG. 1, the connection frame 500 may be placed at the driver side and then slide toward the passenger side. Accordingly, the monitor connected to the connection frame 500 may be placed at the driver side as illustrated in FIG. 4 and then, as illustrated in FIG. 5, slide toward the passenger side on the dashboard.

Figure 6:
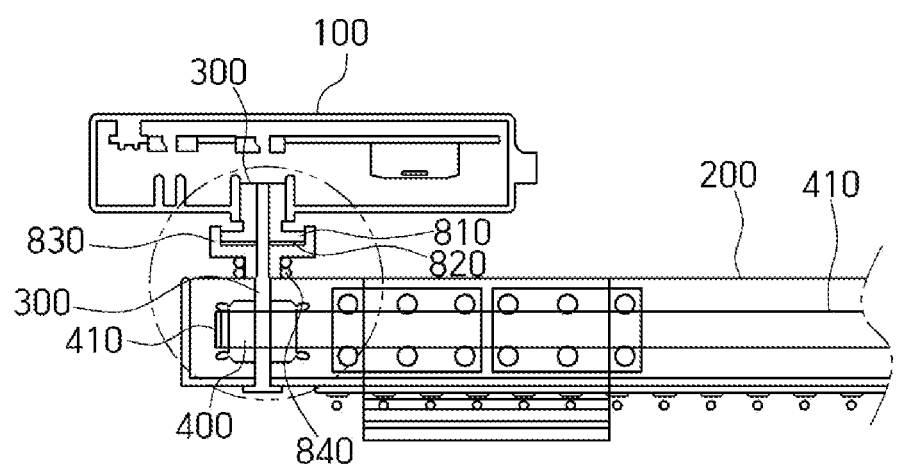

FIG. 6 is an enlarged view of "V" of FIG. 1.

Meanwhile, according to the first embodiment of the present invention, the slip gear module 800 may be further disposed at the motor rotating shaft 310. As illustrated in FIG. 6, the slip gear module 800 includes, at the motor rotating shaft 310, a rear slip gear 810, a slip plate 820, a front slip gear 830, and a spring 840.

The rear slip gear 810 is inserted onto the motor rotating shaft 310 to rotate with the motor rotating shaft 310, and preferably, the other side of the rear slip gear 810 is formed in the shape of a plate to come in contact with the slip plate 820.

The slip plate 820 is formed in the shape of a plate having a hollow and is inserted onto the motor rotating shaft 310 and disposed between the rear slip gear 810 and the front slip gear 830. The slip plate 820 is made of a material.

The front slip gear 830 is inserted onto the motor rotating shaft 310 so as to be vertically movable along the motor rotating shaft 310 and has one side, which comes in contact with the slip plate 820, formed in the shape of a plate having a hollow to rotate with the rear slip gear 810 due to friction with the slip plate 820 and the other side connected to the pulley 410. The front slip gear 830 may further include a guide portion 831 which protrudes toward one side along an outer circumferential surface to allow the rear slip gear and the slip plate to be accommodated. The guide portion 831 may prevent the rear slip gear 810 and the slip plate 820 from falling to the outside.

The spring 840 is disposed between the front slip gear 830 and the main housing 200 to apply a force that allows the front slip gear 830 to move toward the slip plate 820.

Therefore, the slip gear module 800 is connected to the motor rotating shaft 310 through the center between the rear slip gear 810 and the front slip gear 830 and transmits the rotational force transmitted from the motor rotating shaft 310 to the linear power transmitting portion 400 through a frictional force between the rear slip gear 810 and the front slip gear 830.

In the slip gear module 800, when an external force greater than or equal to a predetermined frictional force occurs at the front slip gear 830, a slip may occur with the slip plate 820 to block power due to the external force from being transmitted to the motor rotating shaft 310.

Hereinafter, a monitor sliding process using the vehicle cockpit module assembly according to the embodiment of the present invention will be described with reference to FIGS. 7 and 8.

Figure 7:
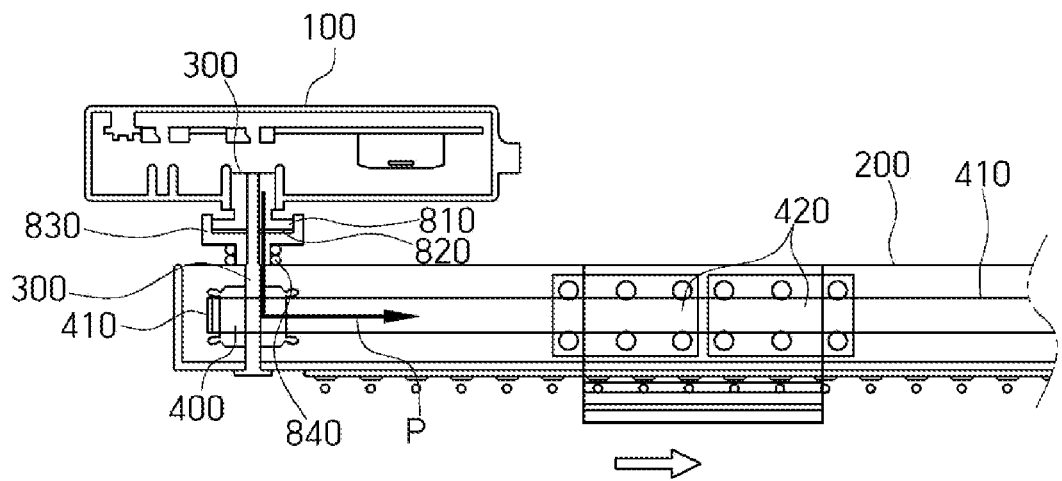

First, as illustrated in FIG. 7, when the motor 300 is rotated toward one side in order to fix a monitor 1 at one side, the monitor 1 moves to a longitudinal end at the passenger side. In this way, the monitor moves from the driver side to the passenger side, and rotation of the motor 300 ends to fix the monitor 1 at one side.

That is, as illustrated in FIG. 7, in order to move the connection frame 500 toward the passenger side, the motor 300 is operated through the actuator module 100.

Then, the rotational force of the motor 300 is transmitted to the pulley 410 through the motor rotating shaft 310, and as the pulley 410 rotates, the timing belt 420 moves due to the pulley 410.

Here, since the timing belt clip 430 is connected to the timing belt 420, as illustrated in FIG. 7, the timing belt clip 430 moves with the timing belt 420 according to movement thereof inside the main housing 200.

Figure 8:
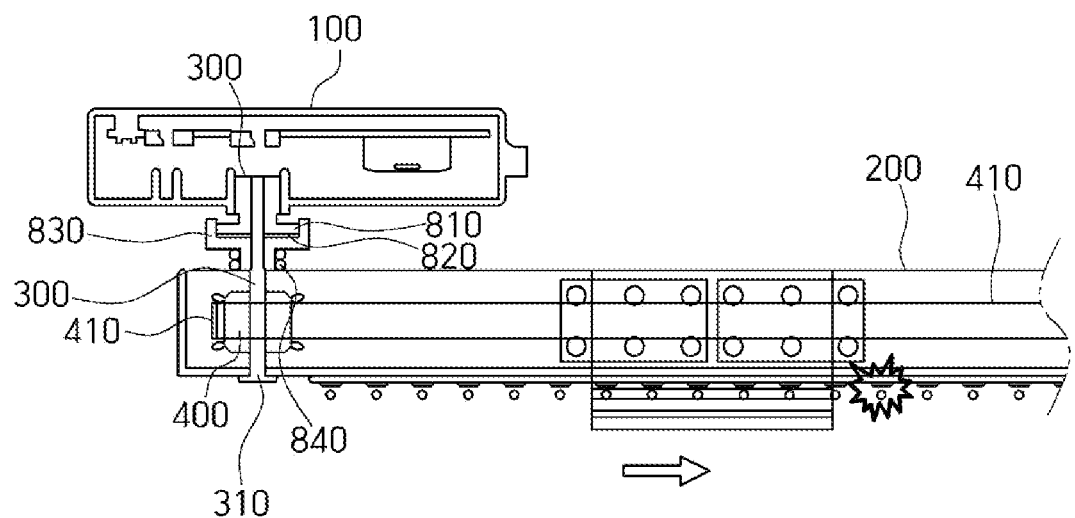

In more detail, FIG. 8 is a reference diagram for describing an operational process when an external force occurs during the monitor sliding process using the vehicle cockpit module assembly according to the embodiment of the present invention.

As illustrated in FIG. 8, the slip gear module 800 including the rear slip gear 810, the slip plate 820, the front slip gear 830, and the spring 840 is further disposed at the motor 300. Thus, in a case in which a rotational force applied from the motor 300 is applied to the pulley 410 and an external force greater than or equal to a predetermined force occurs from the outside, the slip gear module 800 prevents the external force from being applied to the motor rotating shaft 310 and causing damage to the motor 300 and the actuator module 100.

That is, in a state in which the rear slip gear 810, the slip plate 820, and the front slip gear 830 are inserted onto the motor rotating shaft 310, the spring 840 applies an elastic force to the front slip gear 830 in a state of being installed between the front slip gear 830 and the main housing 200.

Thus, the rear slip gear 810, the slip plate 820, and the front slip gear 830 come in close contact due to the elastic force of the spring 840.

In the state in which the rear slip gear 810, the slip plate 820, and the front slip gear 830 are in close contact, when the motor 300 operates and the motor rotating shaft 310 rotates, the rear slip gear 810 inserted onto the motor rotating shaft 310 rotates with the motor rotating shaft 310.

Then, since the rear slip gear 810 and the front slip gear 830 are in close contact due to the spring 840 while the slip plate 820 is disposed therebetween, the slip plate 820 and the front slip gear 830 also rotate with the motor rotating shaft 310 due to a frictional force between the rear slip gear 810 and the slip plate 820 and a frictional force between the slip plate 820 and the front slip gear 830.

Thus, the front slip gear 830 rotates with the rotating shaft, and the pulley 410 connected to the front slip gear 830 also rotates.

Also, according to the operation of the timing belt 420 connected to the pulley 410, the timing belt clip 430, which is connected to the timing belt 420, and the connection frame 500 slide horizontally.

As illustrated in FIG. 8, an external force may occur at the sliding monitor or a monitor bracket 570. Here, the external force may be a force due to insertion of foreign substances that block sliding of the monitor or may be a force applied by a user or from the outside that causes the monitor to move in a reverse direction or forward direction.

In this way, when an external force occurs at the monitor, the monitor bracket 570, the connection frame 500, the timing belt 420, the guide rail 440, and the like, the corresponding external force is transmitted to the pulley 410 through the timing belt 420, and the external force transmitted to the pulley 410 is transmitted to the front slip gear 830.

When the external force is transmitted to the front slip gear 830, a frictional force between the slip plate 820 and the front slip gear 830 exceeds an external force range, and thus a slip occurs between the slip plate 820 and the front slip gear 830.

Thus, due to the slip occurring between the front slip gear 830 and the slip plate 820, the front slip gear 830 is not able to rotate together, and the external force transmitted through the front slip gear 830 is blocked instead of being transmitted to the motor 300 along the slip plate 820 and the rear slip gear 810. Accordingly, there is an effect of protecting the motor and the actuator module from the external force.

Figure 9:
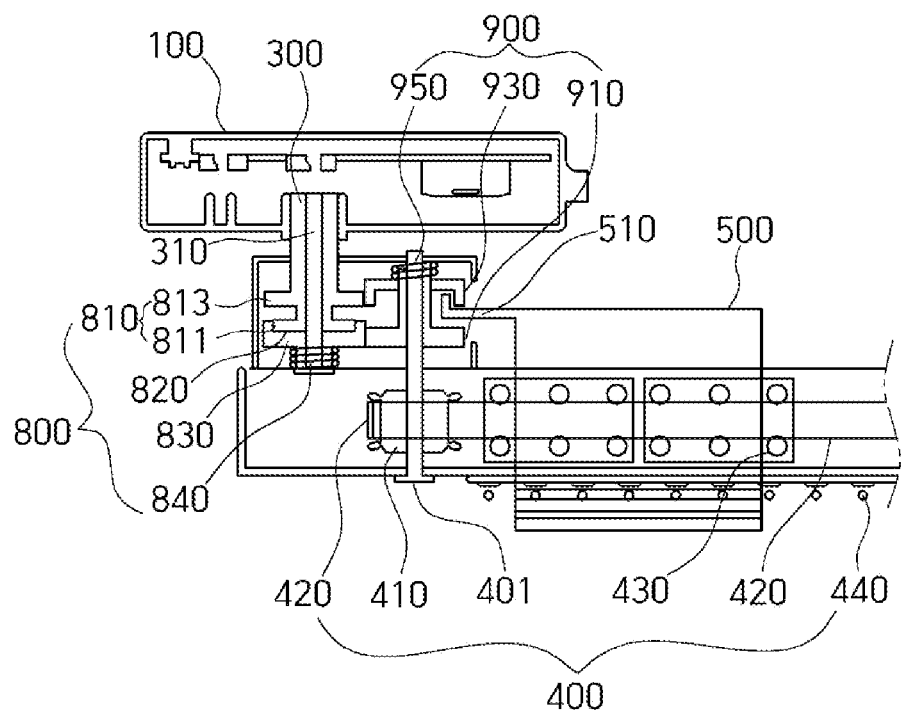
FIG. 9 is a schematic diagram of a vehicle cockpit module assembly according to a second embodiment of the present invention.

FIG. 9 is a schematic diagram for describing a vehicle cockpit module assembly according to a second embodiment of the present invention. The vehicle cockpit module assembly according to the second embodiment of the present invention will be described with reference to FIG. 9.

Components which are the same as those described above in relation to the previous embodiment will be denoted by the same reference numerals, and detailed description thereof will be omitted.

The vehicle cockpit module assembly according to the second embodiment of the present invention includes an actuator module 100, a main housing 200, a motor 300, a linear power transmitting portion 400, and a connection frame 500 according to an embodiment and further includes a slip gear module 800 and a fixed gear module 900.

The main housing 200 that fixes the actuator module 100 is disposed inside a dashboard assembly 10 in which an upper dashboard 11 and a lower dashboard 13 are combined. Also, the main housing 200 guides inside the dashboard assembly 10 so that the monitor horizontally slides using power provided from the actuator module 100.

The main housing 200 is fixed to an interior of the dashboard assembly 10 to fix the actuator module 100 at one side and accommodates a pulley 410, a timing belt 420, a guide rail 440, and a timing belt clip 430 therein.

The motor 300 uses the power provided from the actuator module 100 to provide a rotational force to a motor rotating shaft 310.

Also, the linear power transmitting portion 400 converts rotary motion applied from the motor 300 into linear motion. To this end, the linear power transmitting portion 400 may include the pulley 410, the timing belt 420, and the timing belt clip 430 and may further include the guide rail 440.

The pulley 410 includes a pulley rotating shaft 401 and rotates due to a rotational force transmitted to the pulley rotating shaft 401 through the slip gear module 800. Meanwhile, the fixed gear module 900 which consists of an interlocking gear 910 and a locking gear 930 is provided at the pulley rotating shaft 401.

The timing belt 420 is disposed inside the main housing 200 and has one side connected to the pulley 410 to convert rotary motion applied from the pulley rotating shaft 401 into linear motion. Here, the timing belt 420 is disposed in the main housing 200 and transmits rotary power applied from the pulley 410 as linear power that allows the monitor to horizontally move within a range of the main housing 200.

Also, in order to improve driver or passenger usability of the device according to a use environment, the timing belt 420 may be set to have 390 mm as a horizontal sliding operation distance, but preferably, the horizontal sliding operation distance may vary according to the vehicle model and operation concept.

In addition, the timing belt clip 430 has one side fixed to the timing belt 420 to horizontally move inside the main housing 200 according to the linear motion of the timing belt 420. Meanwhile, at the timing belt clip 430, the guide rail 440 configured to guide when the connection frame 500 moves due to the timing belt 420 may be further disposed at the main housing 200.

The connection frame 500 further includes a guide rib 510 configured to rotate the locking gear 930 toward one side according to a position to which the guide rib 510 is moved toward one side so that the locking gear 930 is able to be physically bound to the rear slip gear 810 when the connection frame 500 is fixed at the longitudinal end at one side.

At the motor rotating shaft 310, the slip gear module 800 including a rear slip gear 810, a slip plate 820, a front slip gear 830, and a spring 840 is disposed.

The rear slip gear 810 of the slip gear module 800 is inserted onto the motor rotating shaft 310 and rotates with the motor rotating shaft 310.

The rear slip gear 810 includes a front slip gear connecting portion 811 and a locking gear connecting portion 813.

The front slip gear connecting portion 811 has a center into which the pulley rotating shaft 401 is inserted and has a lower surface formed to come in contact with the slip plate 820.

The locking gear connecting portion 813 is disposed at an upper portion of the front slip gear connecting portion 811 to rotate with the motor rotating shaft 310 and is configured to be engaged with an insert gear 931 disposed at a portion of a lower end of the locking gear 930.

Here, the fixed gear module 900 may further include a torsion spring 950 which is configured to, in a state of being inserted onto the pulley rotating shaft 401, provide a force in one rotational direction to the locking gear 930 so that the rotational force applied through the interlocking gear 910 is applied to the pulley 410 through the pulley rotating shaft 401 in a state in which an external force is not applied from the outside.

Meanwhile, in a fastening structure between the rear slip gear 810 and the locking gear 930, a portion of the insert gear 931 for engaging with the rear slip gear 810 is disposed at a lower end portion of the locking gear 930, and a guide protrusion 933 for coming in contact with the guide rib 510 of the connection frame 500 is disposed at the other side of the locking gear 930.

Also, the locking gear connecting portion 813 for mounting the insert gear 931 of the locking gear 930 may be disposed at the rear slip gear 810.

Also, for physical binding of the rear slip gear 810 and the locking gear 930, an external force greater than or equal to the frictional force between the rear slip gear 810 and the slip plate 820 is applied so that a slip occurs between the rear slip gear 810 and the slip plate 820.

In addition, the slip plate 820 is disposed at a lower portion of the rear slip gear 810.

Also, the front slip gear 830 is inserted onto the motor rotating shaft 310 so as to be vertically movable along the motor rotating shaft 310 and, upon contact with the slip plate 820, rotates with the rear slip gear 810 due to friction. Here, when an external force greater than or equal to a predetermined frictional force occurs, a slip occurs with the slip plate 820 to block power due to the external force from being transmitted to the motor rotating shaft 310.

In addition, the spring 840 is disposed between the front slip gear 830 and the main housing 200 to apply a force that allows the front slip gear 830 to move toward the slip plate 820.

Meanwhile, the interlocking gear 910 of the fixed gear module 900 is for engaging with the front slip gear 830 of the slip gear module 800 to receive rotary power transmitted from the front slip gear 830. The interlocking gear 910 has a center, into which the pulley rotating shaft 401 is inserted, and is physically bound to the front slip gear 830 to receive the rotary power and transmit the rotary power to the pulley rotating shaft 401.

The locking gear 930 has a center into which the pulley rotating shaft 401 is inserted and is disposed at an upper side of the interlocking gear 910 and bound to the rear slip gear 810 to physically lock the rear slip gear 810 when an external force is applied from the outside so that the connection frame 500 which is sliding is able to be fixed at a longitudinal end even when an external force by a user and an inertial load occur.

Hereinafter, an operational process according to the second embodiment of the present invention will be described.

Figure 10:
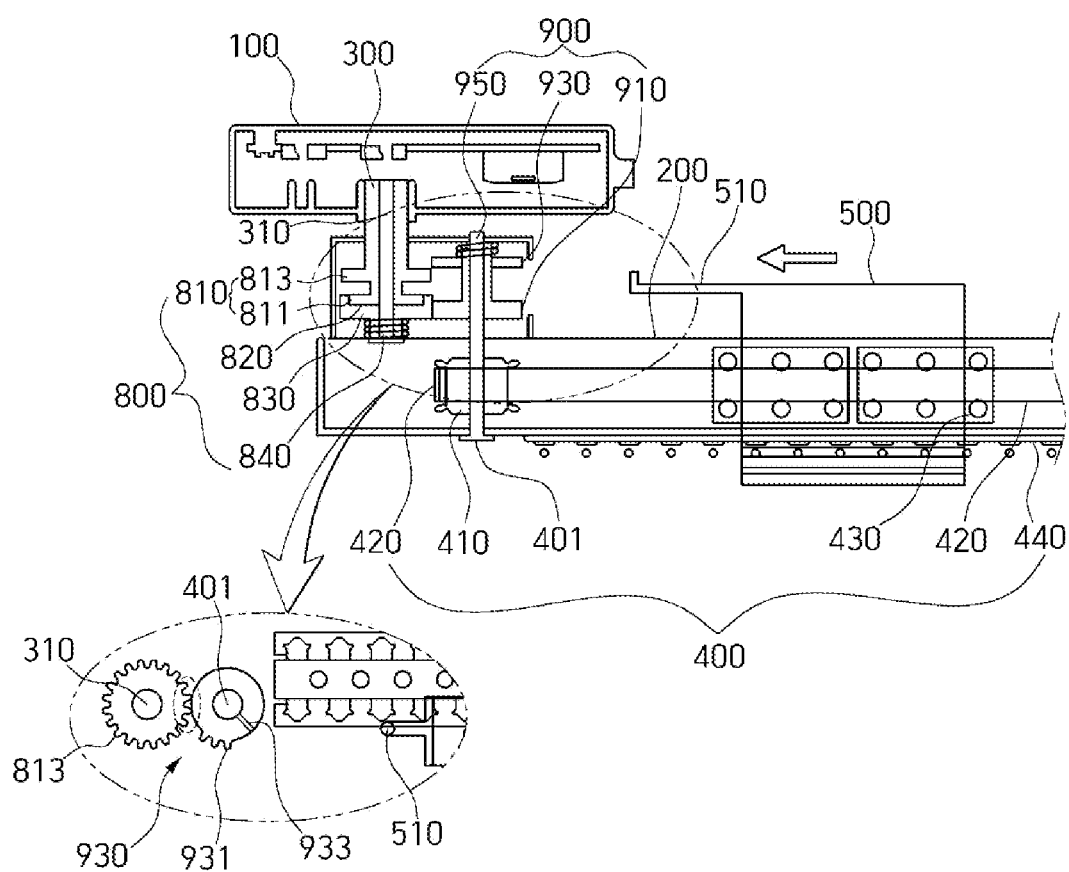
FIG. 10 is a reference diagram for describing a power transmission process for sliding of a monitor in the second embodiment of the present invention.

FIG. 10 is a reference diagram for describing a power transmission process for sliding of a monitor in the second embodiment of the present invention.

First, to slide the connection frame 500, the locking gear 930 into which the pulley rotating shaft 401 is inserted is rotated in one rotational direction due to the torsion spring 950 such that the locking gear 930 is not engaged with the rear slip gear 810 while the front slip gear 830 and the interlocking gear 910 are engaged.

In the state in which the locking gear 930 and the rear slip gear 810 are not engaged, a rotational force applied from the front slip gear 830 is applied to the interlocking gear 910 to rotate the pulley 410.

In this state, when the actuator module 100 provides electricity to the motor 300, the motor rotating shaft 310 rotates due to the motor 300, and the rear slip gear 810 inserted onto the motor rotating shaft 310 rotates.

Here, the slip plate 820 disposed at a lower portion of the rear slip gear 810 and the front slip gear 830 disposed at a lower portion of the slip plate 820 come in close contact due to the spring 840, and the front slip gear 830 rotates with the rear slip gear 810 due to the frictional force between the rear slip gear 810 and the slip plate 820 and the frictional force between the slip plate 820 and the front slip gear 830.

Thus, the interlocking gear 910 engaged with the front slip gear 830 also rotates, and the pulley rotating shaft 401 also rotates due to the interlocking gear 910.

In addition, the pulley 410 rotates according to the rotation of the pulley rotating shaft 401, and the timing belt 420 linearly moves due to the pulley 410. Here, since the timing belt clip 430 is connected to the timing belt 420, as illustrated in FIG. 10, the timing belt clip 430 moves inside the main housing 200 together with the timing belt 420 according to movement thereof.

Figure 11:
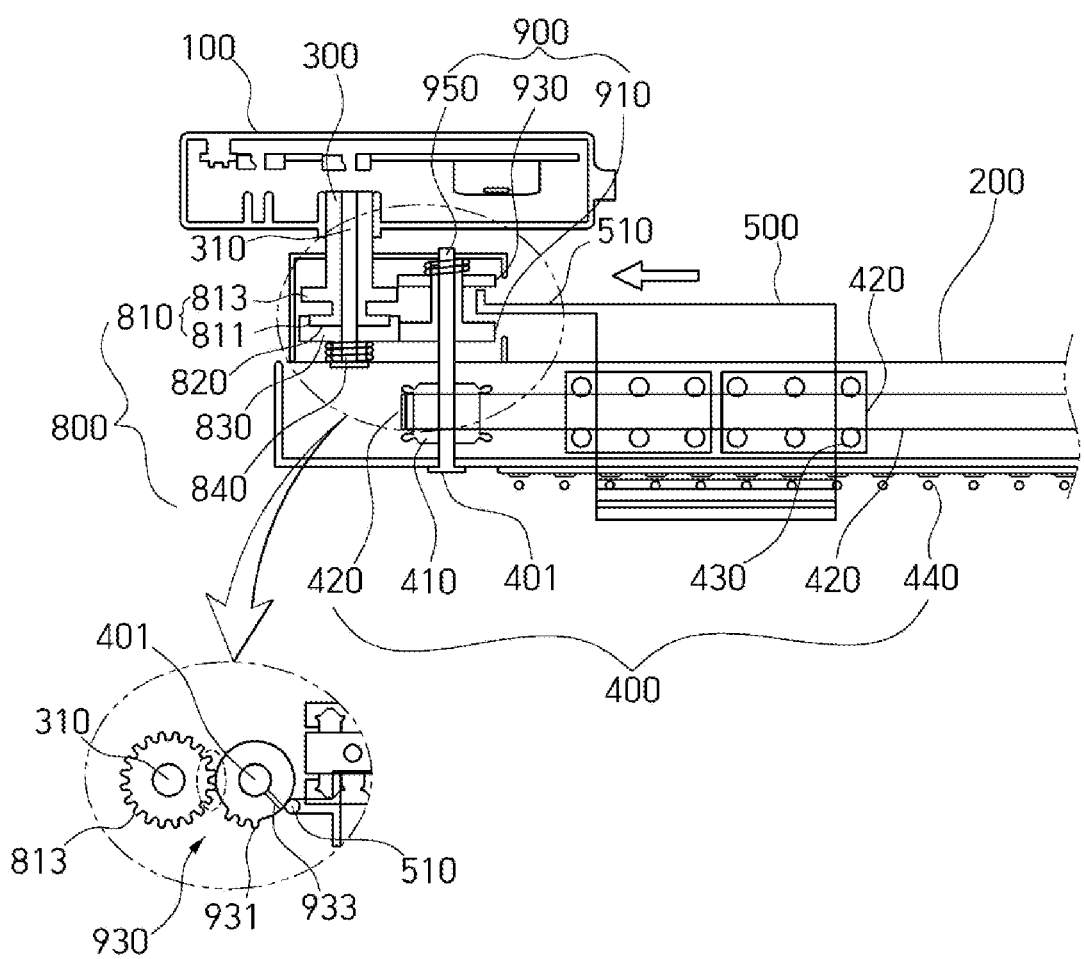
FIG. 11 is a state diagram illustrating a state in which a connection frame 500 is slid toward a driver side in the second embodiment of the present invention.

FIG. 11 is a schematic diagram for describing a process for moving the connection frame 500 from the passenger side to the driver side in the second embodiment of the present invention.

Meanwhile, to fix the connection frame 500 at the driver side, as illustrated in FIG. 11, the connection frame 500 is slid toward the driver side using the actuator module 100 and the motor 300.

Figure 12:
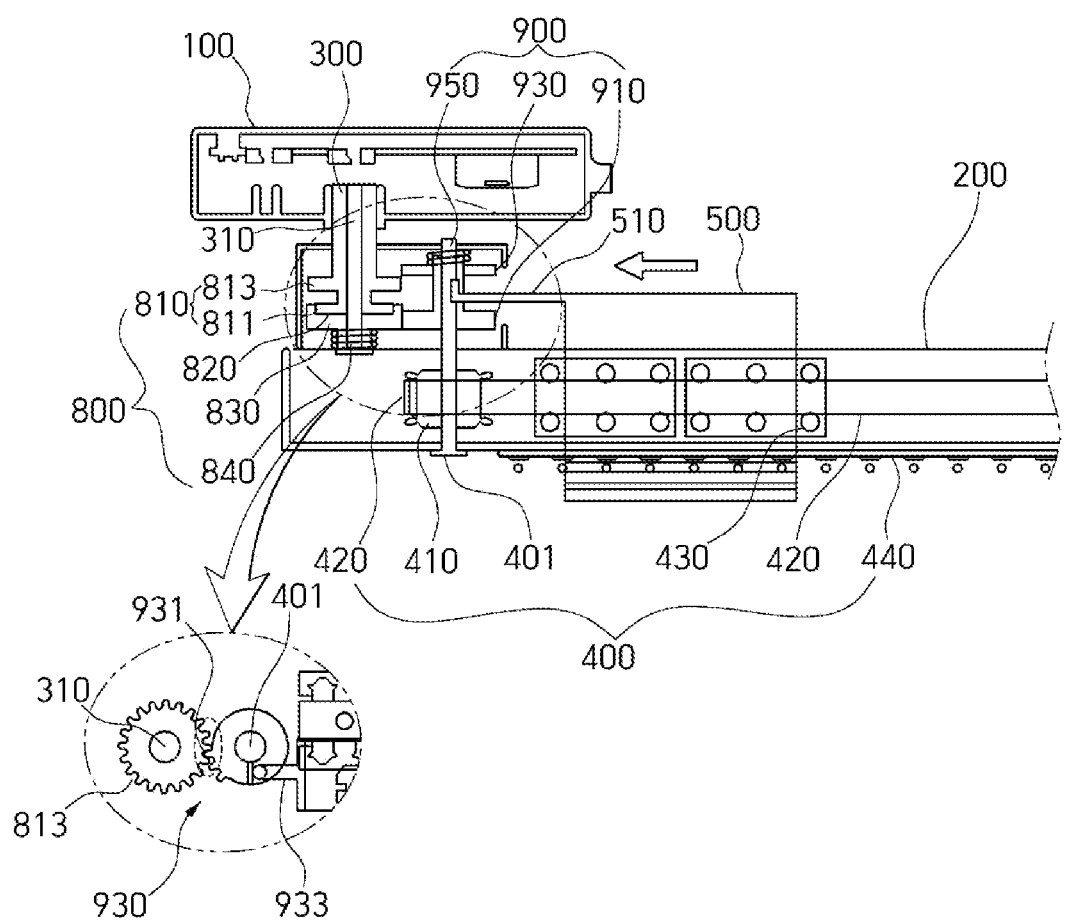
FIGS. 12 and 13 are reference diagrams for describing a process of fixing the connection frame 500 in the second embodiment of the present invention.

As illustrated in FIG. 12, when the connection frame 500 moving toward the driver side reaches the longitudinal end at the driver side, the connection frame 500 should be fixed.

In the process of fixing the connection frame 500 in the second embodiment of the present invention, as illustrated in FIG. 12, as the connection frame 500 moves toward the driver side, the guide rib 510 of the connection frame 500 connected to the monitor comes in contact with the guide protrusion 933 disposed at the locking gear 930.

When the monitor moves toward the driver side in the state in which the guide protrusion 933 of the locking gear 930 and the guide rib 510 of the connection frame 500 are in contact, the guide protrusion 933 formed at a lower end portion of the locking gear 930 rotates in the other direction due to the connection frame 500.

Figure 13:
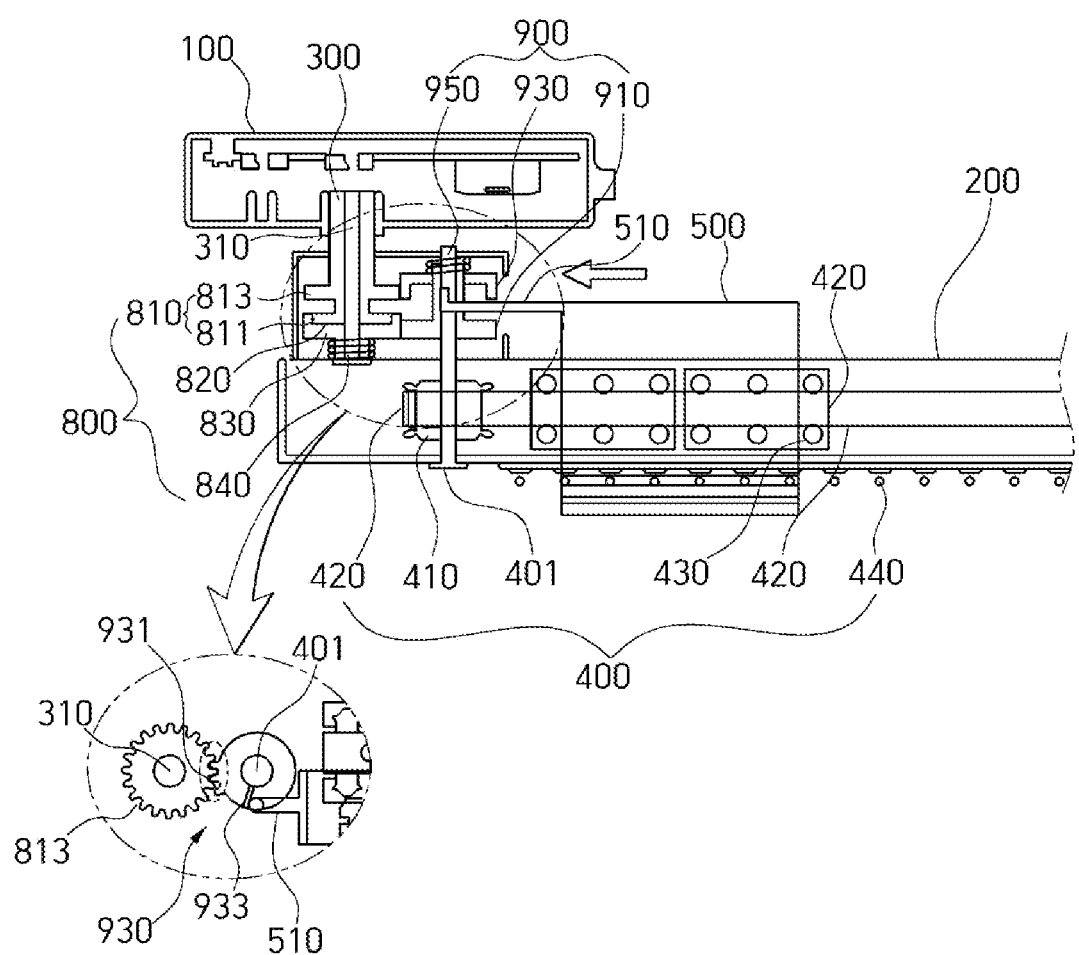

Then, as illustrated in FIG. 13, when the connection frame 500 connected to the monitor moves to the longitudinal end at the driver side, as the locking gear 930 rotates in the other direction, the insert gear 931 disposed at a portion of a lower end of the locking gear 930 is engaged with the rear slip gear 810 and fixed.

Figure 14:
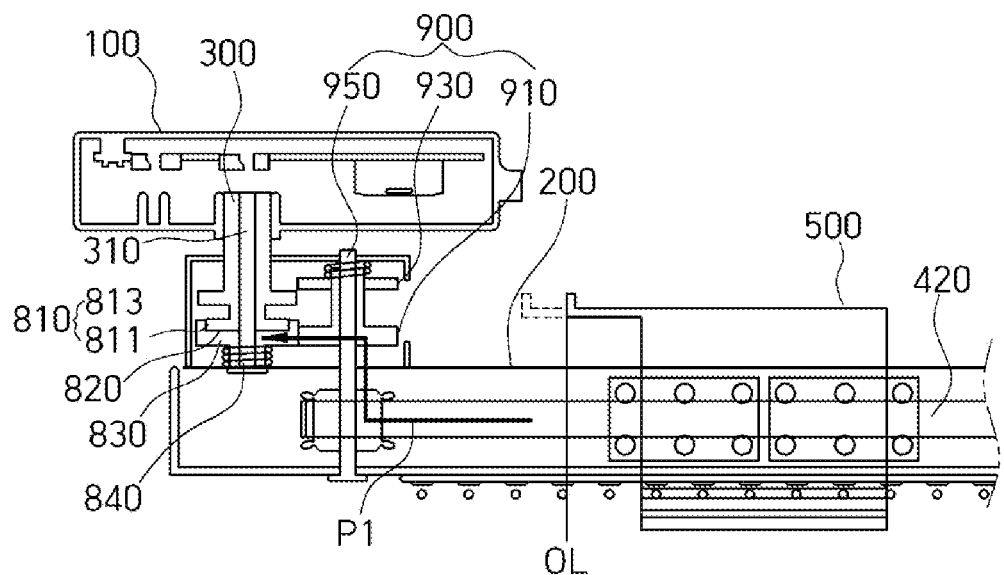
FIG. 14 is a reference diagram for describing a state in which an abnormal operation section, in which the monitor moves toward the driver side due to an external force, occurs in the second embodiment of the present invention.

Meanwhile, in the second embodiment of the present invention, as illustrated in FIG. 14, when an abnormal operation section occurs in which the monitor moves to the driver side due to an external force and thus the external force is transmitted through the timing belt 420, an external force P1 is transmitted to the front slip gear 830 through the pulley 410, the pulley rotating shaft 401, and the interlocking gear 910, and a slip occurs when the external force P1 is greater than the frictional force between the slip plate 820 and the front slip gear 830.

Thus, the external force P1 is blocked from being transmitted to the motor 300 and the actuator module 100 along the front slip gear 830 and the motor rotating shaft 310.

According to the second embodiment of the present invention, even when an external force occurs, only the rear slip gear 810 rotates due to the motor 300. Accordingly, there is an effect of preventing damage to other configurations for sliding of the monitor from occurring due to a slip of the rear slip gear 810 and the front slip gear 830.

Figure 15:
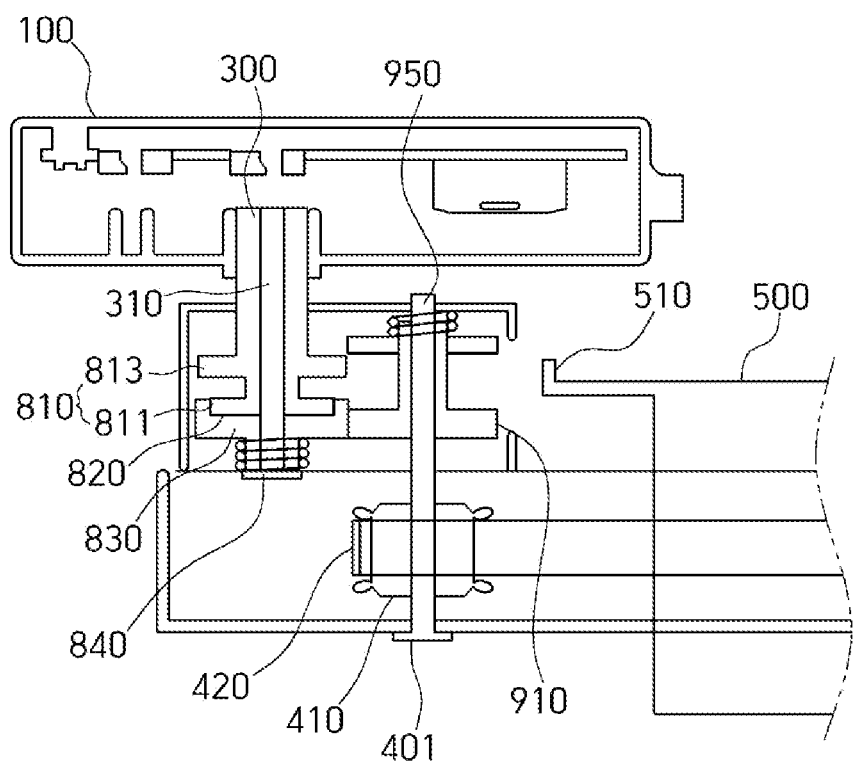
FIG. 15 is a reference diagram for describing a state when the monitor is stopped due to an external force in the second embodiment of the present invention.

On the other hand, when the monitor stops due to an external force during normal operation in the second embodiment of the present invention, as illustrated in FIG. 15, as the monitor stops, the timing belt 420, the pulley 410, the pulley rotating shaft 401, the interlocking gear 910, and the front slip gear 830 sequentially stop rotating and moving in that order.

Here, when an external force greater than the frictional force between the rear slip gear 810 and the front slip gear 830 occurs, the slip occurs, and while the rear slip gear 810 in which the slip occurred rotates due to the motor 300, other devices are stopped. Accordingly, there is an effect of preventing damage to the other configurations for sliding.

Components which are the same as those described above in relation to the previous embodiments will be denoted by the same reference numerals, and detailed description thereof will be omitted.

Figure 16:
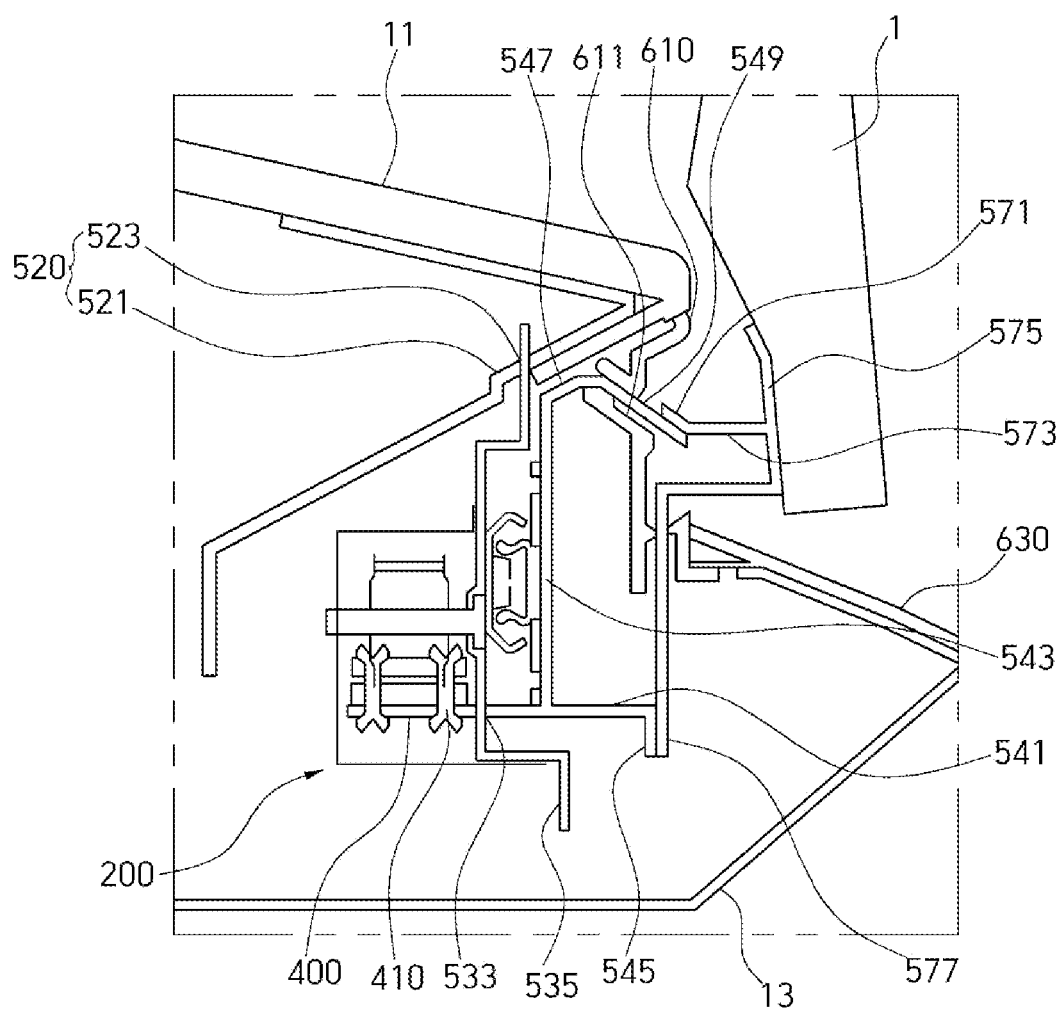
FIG. 16 is a cross-sectional view for describing a vehicle cockpit module assembly according to a third embodiment of the present invention.

FIG. 16 is a cross-sectional view for describing a vehicle cockpit module assembly according to a third embodiment of the present invention.

As illustrated in FIG. 16, the vehicle cockpit module assembly according to the third embodiment of the present invention includes a dashboard connection bracket 520, a rail assembly 530, a connection bracket 540, and a monitor bracket 570.

To allow a monitor to horizontally move in front of a dashboard, a sliding structure 15 having a predetermined length is formed between an upper dashboard 11 and a lower dashboard 13 of a dashboard assembly 10 to allow the monitor to horizontally slide when the lower dashboard 13 is coupled to the upper dashboard 11.

The rail assembly 530 which accommodates a timing belt 420 and a pulley 410 configured to horizontally move the connection bracket 540, which is connected to the monitor, is disposed inside the dashboard assembly 10.

The dashboard connection bracket 520 includes a bent portion 521 which has the same shape as a bent inner side surface of the upper dashboard 11, and a structure insertion groove 523 for inserting the rail assembly 530 is disposed at one side extending from the bent portion 521.

The rail assembly 530 includes a main housing 200 configured to accommodate a linear power transmitting portion 400 including the pulley 410, the timing belt 420, and a timing belt clip 430 and a fixing bracket 531 configured to fix the main housing 200 to the dashboard connection bracket 520.

Also, in the fixing bracket 531 of the rail assembly 530, a hole 533 for allowing horizontal movement of the connection bracket 540, which is connected to the timing belt clip 430 accommodated in the main housing 200, is formed within a predetermined movement range. Here, for rigidity of the product, the fixing bracket 531 may be formed so that an upper portion and a lower portion thereof are partially bent.

The connection bracket 540 includes a belt connecting member 541, an extending member 543, a lower fixing member 545, a support member 547, and a monitor connecting member 549.

The belt connecting member 541 has one side inserted into the hole 533 of the fixing bracket 531 and then connected to the timing belt clip 430, the extending member 543 extends from one side of the belt connecting member 541 in a direction perpendicular thereto, the lower fixing member 545 is disposed at a longitudinal end of the belt connecting member 541, the support member 547 is formed to extend from a longitudinal end of the extending member 543 so as to be bent to be parallel to the upper dashboard 11 or the dashboard connection bracket 520, and the monitor connecting member 549 is formed to be bent from a longitudinal end of the support member 547 in a downward direction symmetrical to a gaze of the driver and is connected to the monitor bracket 570.

Meanwhile, a garnish 600 consists of an upper garnish 610 and a lower garnish 630.

The upper garnish 610 is bent inward from an end portion of the upper dashboard 11 so as to close an open portion of the dashboard assembly 10 and includes an insertion guide hole 611 to allow the monitor connecting member 549 to pass therethrough.

Therefore, preferably, the upper garnish 610 may be formed to be bent inward from the end portion of the upper dashboard 11 so that the open portion of the dashboard assembly 10 may be closed.

Here, preferably, the insertion guide hole 611 included in the upper garnish 610 may have a predetermined length to guide the monitor connecting member 549 after the monitor connecting member 549 is inserted into the insertion guide hole 611.

In this way, since the insertion guide hole 611 of the upper garnish 610 is formed to have a predetermined length and be symmetrical to the gaze of the driver or passenger, there is an effect of not exposing an inner slit shape and an inner structure along the gaze of the driver or passenger.

The monitor bracket 570 consists of an upper connecting portion 571 which is fastened to the monitor connecting member 549 passing through the upper garnish 610, an extending portion 573 which extends from the upper connecting portion 571, a monitor connecting portion 575 which is formed in a perpendicular direction from the extending portion 573 so as to be connected to the monitor, and a lower connecting portion 577 which extends from the monitor connecting portion 575 so as to be fastened to the lower fixing member 545.

Also, the lower garnish 630 is fastened to one side of the lower connecting portion 577 of the monitor bracket 570 and covers the lower dashboard 13.

Meanwhile, preferably, the upper dashboard 11 may consist of a first board which is exposed to the driver and a second board which is formed due to an end portion of the first board being bent inward.

In addition, the dashboard connection bracket 520 consists of a first bracket which is fixed to a lower surface of the upper dashboard 11 and a second bracket which is bent at a predetermined angle from the first bracket.

Hereinafter, a process of assembling the vehicle cockpit module assembly according to the third embodiment of the present invention will be described with reference to FIGS. 17 to 23.

Figure 17:
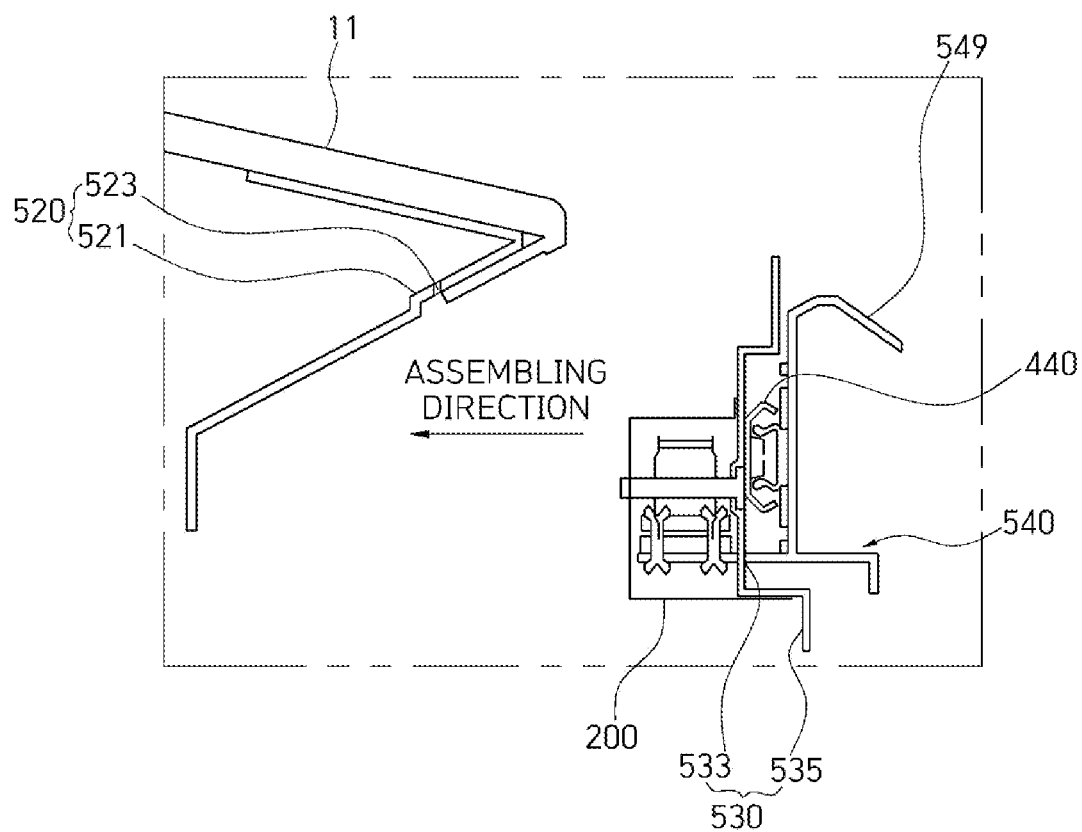
FIGS. 17 to 25 are reference diagrams for describing a process of assembling the vehicle cockpit module assembly according to the third embodiment of the present invention.

First, as illustrated in FIG. 17, the bent portion 521 of the dashboard connection bracket 520 is inserted into the upper dashboard 11 of the dashboard assembly 10 and fixed.

Then, in a state in which the rail assembly 530 consisting of the main housing 200 and the fixing bracket 531 is coupled to the connection bracket 540, the fixing bracket 531 is inserted into the structure insertion groove 523 of the dashboard connection bracket 520 and then fixed.

Here, the rail assembly 530 includes the main housing 200 configured to accommodate the linear power transmitting portion 400 including the pulley 410, the timing belt 420, and the timing belt clip 430 and the fixing bracket 531 configured to fix the main housing 200 to the dashboard connection bracket 520.

Also, the connection bracket 540 consists of the belt connecting member 541 which is connected to the timing belt 420 and the pulley 410 in a state of being inserted into the hole 533 of the main housing 200, the extending member 543 which extends from one side of the belt connecting member 541 in a direction perpendicular thereto, the lower fixing member 545 which is disposed at the longitudinal end of the belt connecting member 541, the support member 547 which is formed to be bent from the longitudinal end of the extending member 543 so as to be parallel to the upper dashboard 11 or the dashboard connection bracket 520, and the monitor connecting member 549 which is formed to be bent downward from the longitudinal end of the support member 547 and connected to the monitor bracket 570.

Figure 18:
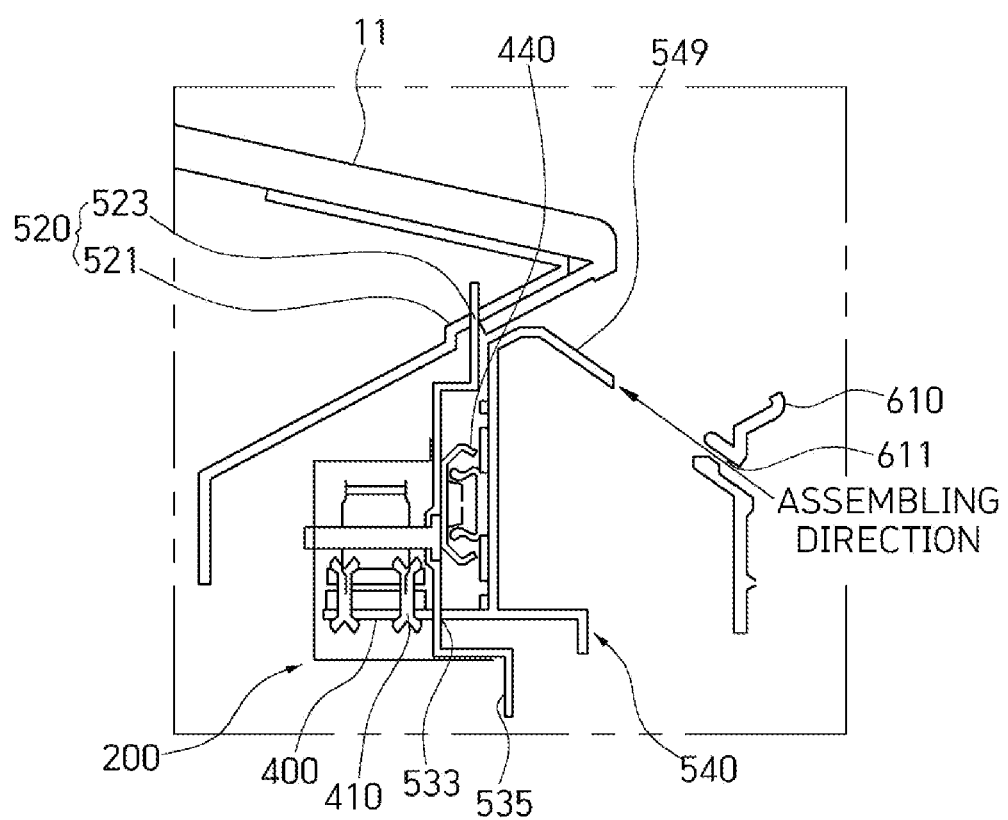
Figure 19:
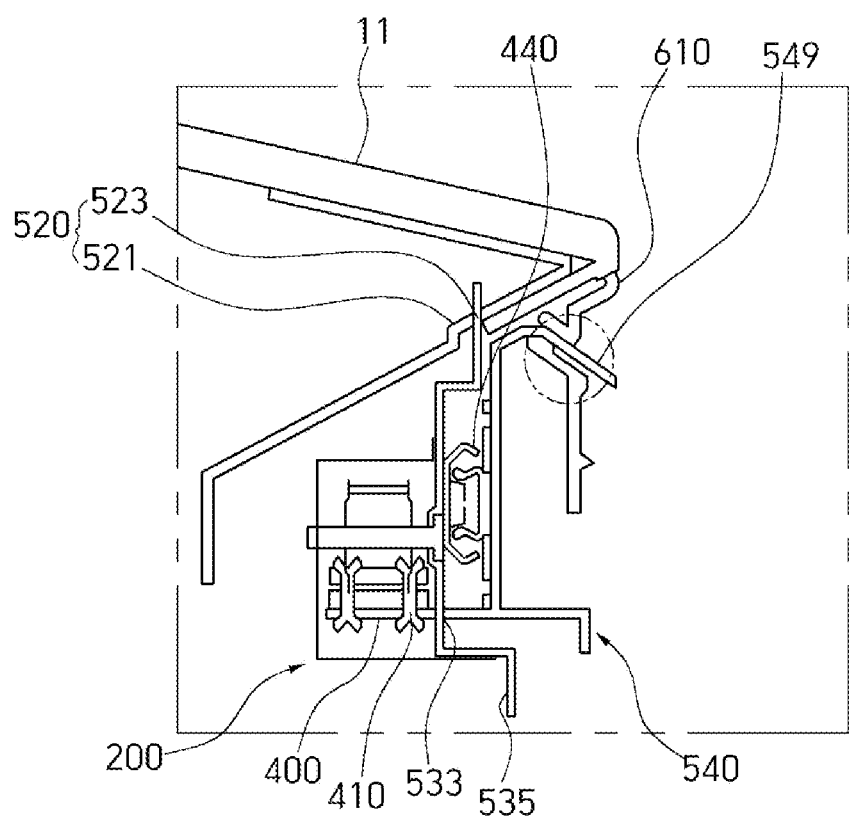

Then, as illustrated in FIGS. 18 and 19, the monitor connecting member 549 is assembled by being passed through the insertion guide hole 611 of the upper garnish 610. Here, the upper garnish 610 may be formed to be bent inward from the end portion of the upper dashboard 11 to close the open portion of the dashboard assembly 10.

Figure 20:
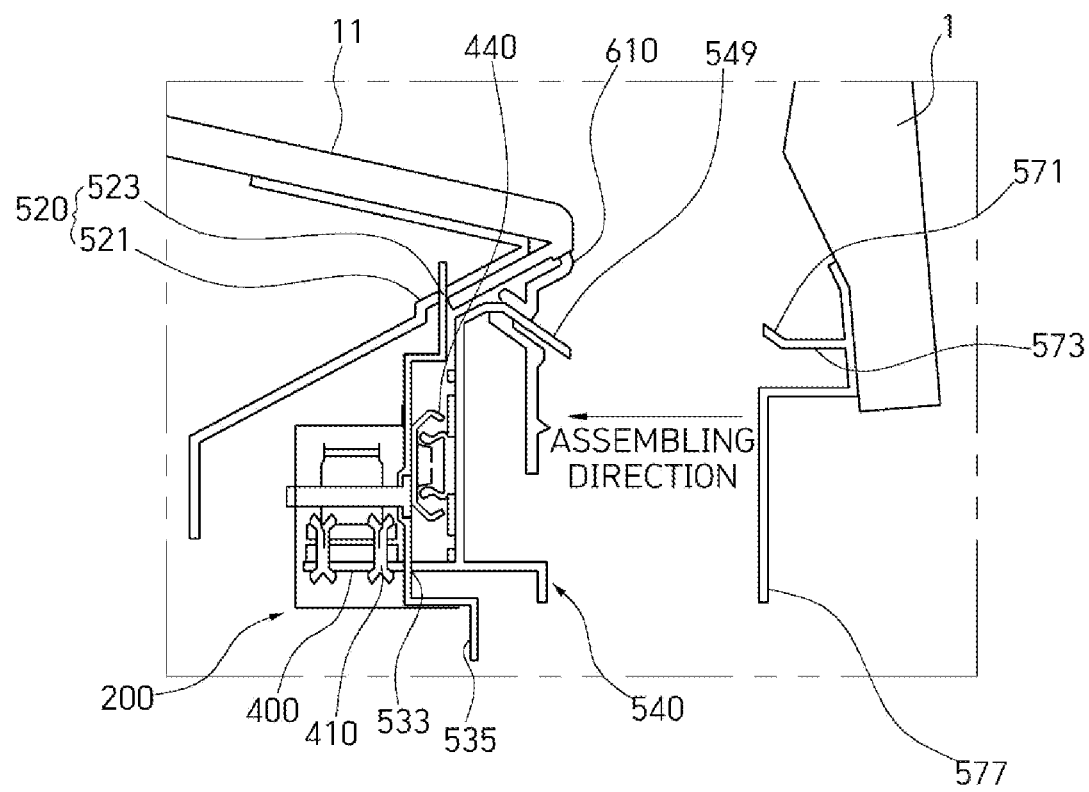
Figure 21:
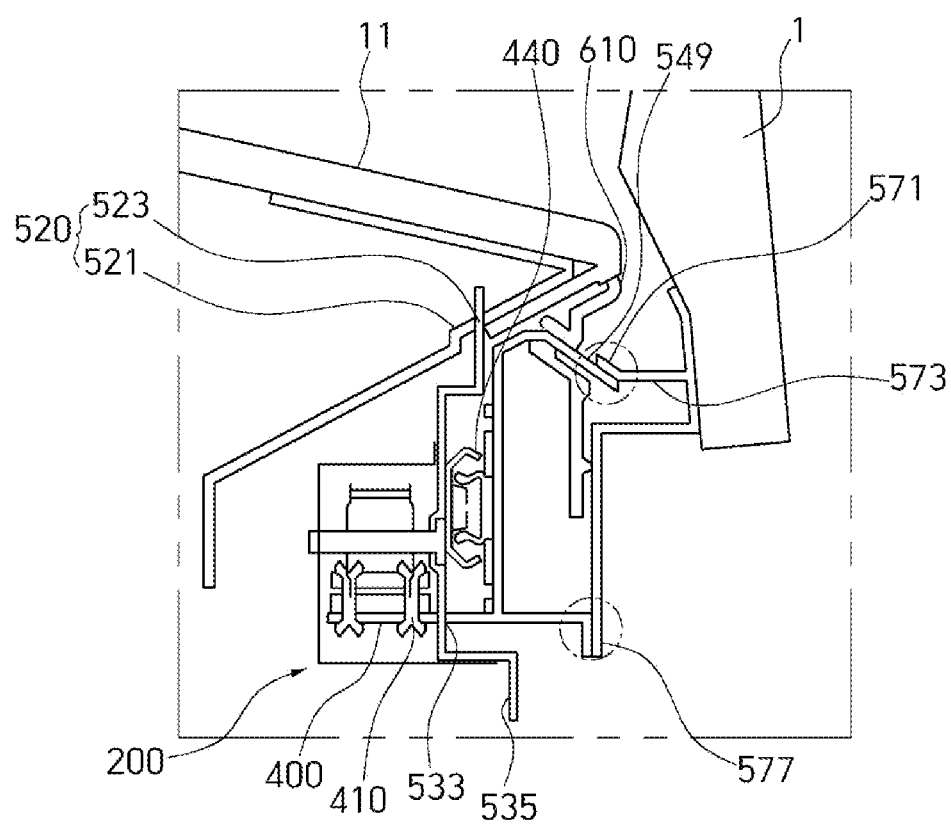

Then, as illustrated in FIGS. 20 and 21, the monitor connecting member 549 passing through the insertion guide hole 611 of the upper garnish 610 is assembled to the upper connecting portion 571 of the monitor bracket 570, and the lower fixing member 545 of the connection bracket 540 is fastened to the lower connecting portion 577 of the monitor bracket 570.

Here, the monitor bracket 570 consists of the upper connecting portion 571 which is fastened to the monitor connecting member 549 passing through the upper garnish 610, the extending portion 573 which extends from the upper connecting portion 571, the monitor connecting portion 575 which is formed in a perpendicular direction from the extending portion 573 so as to be connected to the monitor, and the lower connecting portion 577 which extends from the monitor connecting portion 575 so as to be fastened to the lower fixing member 545.

Figure 22:
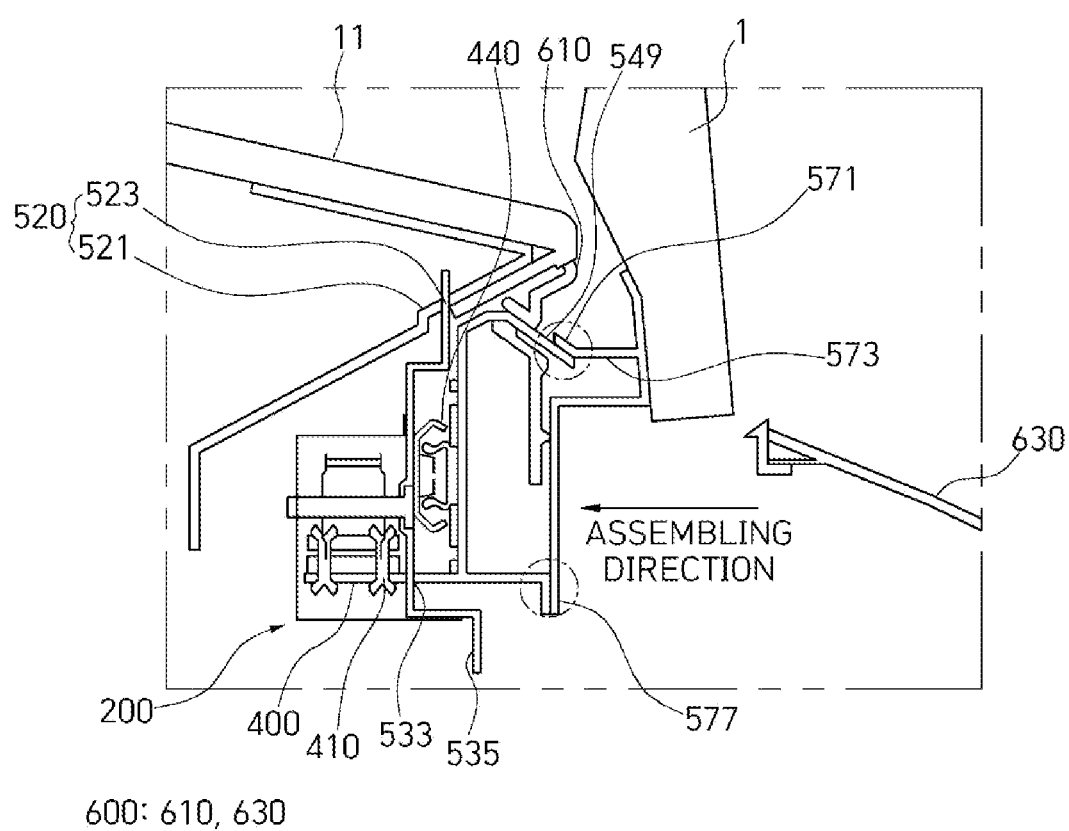
Figure 23:
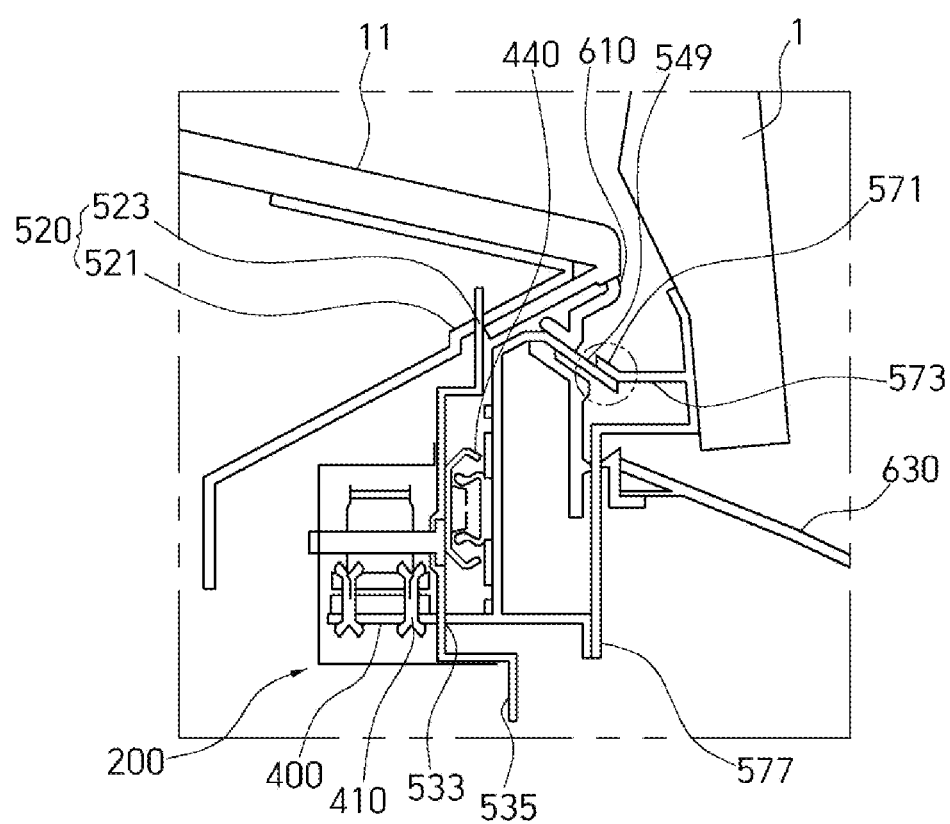

Then, as illustrated in FIGS. 22 and 23, the lower dashboard 13 is covered by fastening the lower garnish 630 to the lower connecting portion 577 of the monitor bracket 570.

Figure 24:
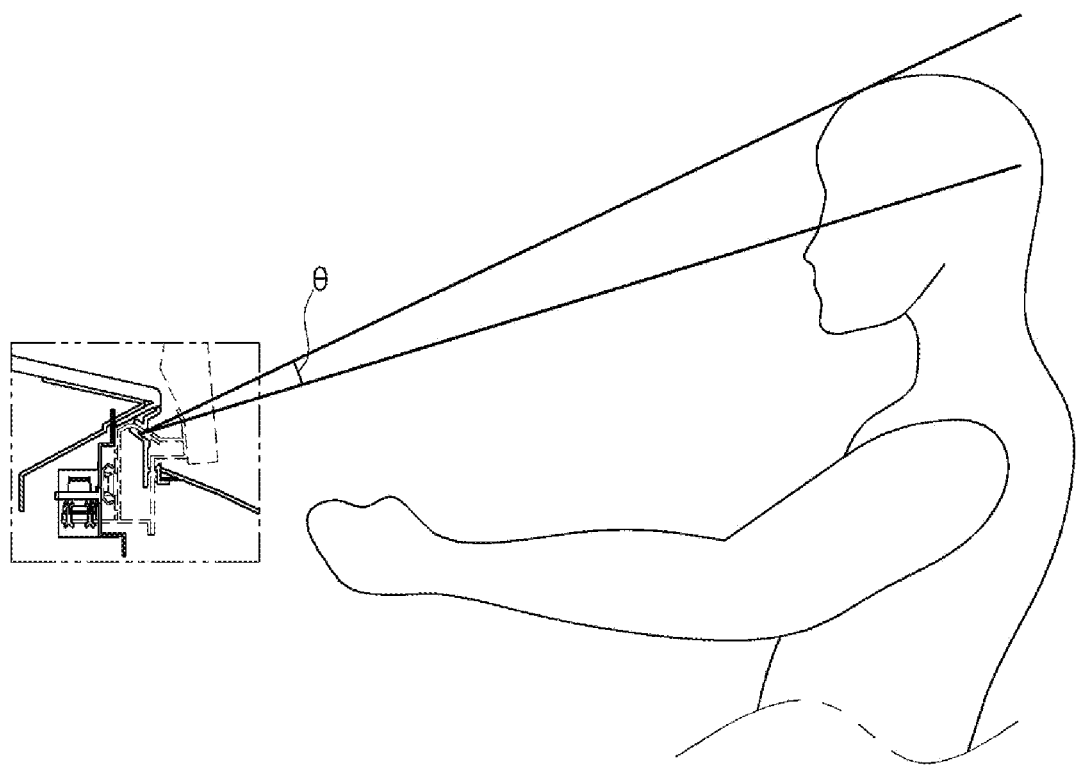
Figure 25:
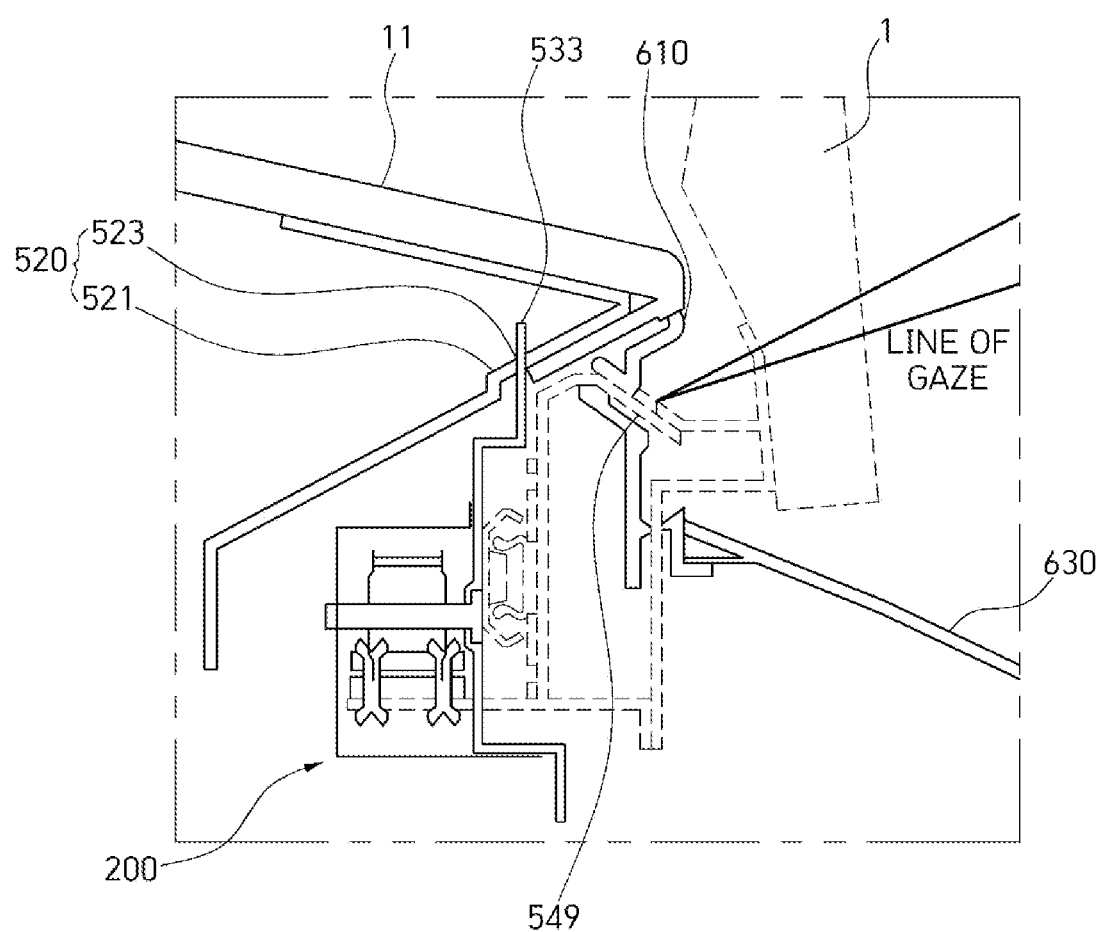

In this way, according to the third embodiment of the present invention, as illustrated in FIGS. 24 and 25, the monitor may horizontally move in front of the dashboard, and even when the monitor horizontally moves, the inner slit shape or inner structure is not exposed to the driver through the insertion guide hole 611 of the upper garnish 610.

Preferably, the insertion guide hole 611 included in the upper garnish 610 may have a predetermined length to guide the monitor connecting member 549 after the monitor connecting member 549 is inserted into the insertion guide hole 611.

According to a first embodiment of the present invention, it is possible to simultaneously support a sliding function of a monitor and, even when an external force is transmitted from the outside, prevent the corresponding external force from being applied to an actuator module and a motor and causing damage thereto.

According to a second embodiment of the present invention, even when an external force occurs, only a rear slip gear rotates due to a motor. Thus, it is possible to prevent damage to other configurations for sliding of the monitor from occurring due to a slip of the rear slip gear and a front slip gear.

Here, when an external force greater than a frictional force between the rear slip gear and the front slip gear occurs, the slip occurs, and while the rear slip gear in which the slip occurred rotates due to the motor, other devices are stopped. Accordingly, damage to the other configurations for sliding can be prevented.

According to a third embodiment of the present invention, an insertion guide hole of an upper garnish is formed to have a predetermined length and be symmetrical to a gaze of a driver or a passenger. Thus, an inner slit shape and an inner structure are not exposed along the gaze of the driver or passenger.

The configurations of the present invention have been described in detail above with reference to the accompanying drawings, but the above description is only illustrative, and those of ordinary skill in the art to which the present invention pertains should understand that various modifications and changes can be made within the scope of the technical spirit of the present invention. Therefore, the scope of the present invention should not be limited by the embodiments described above and should be defined by the claims below.

What is claimed is:

1. A vehicle cockpit module assembly which is disposed inside a dashboard for a vehicle, the vehicle cockpit module assembly comprising:
    a dashboard connection frame inserted into a bent inner side surface of an upper dashboard and comprising a structure insertion groove for insertion disposed at one extended side thereof;
    a rail assembly comprising a main housing configured to accommodate a linear power transmitting portion, which comprises a pulley and a timing belt and a fixing bracket coupled to one side of the main housing, the fixing bracket being configured to be inserted into the structure insertion groove of the dashboard connection frame, and comprising a sliding hole formed at one side to allow horizontal sliding of a monitor; and
    a connection frame having one side thereof fastened to the linear power transmitting portion, which is disposed inside the main housing, through the sliding hole and the other side thereof fastened to the monitor to allow the monitor to slide in the sliding hole due to the linear power transmitting portion.

2. The vehicle cockpit module assembly of claim 1, wherein the dashboard comprises:
    the upper dashboard, which is a body front end assembly constituting a front vertical plane of a body; and
    a lower dashboard, which is assembled to the upper dashboard to form a partition that divides a front body and an interior of the vehicle,
    wherein, when the upper dashboard and the lower dashboard are assembled, a sliding space for horizontal sliding of the connection frame is formed between the upper dashboard and the lower dashboard.

3. The vehicle cockpit module assembly of claim 2, wherein the upper dashboard comprises a bent portion having a longitudinal end that is bent and extended.

4. The vehicle cockpit module assembly of claim 3, wherein, in the dashboard connection frame:
    a bent portion which has a same shape as the bent portion of the upper dashboard is formed; and
    the structure insertion groove is formed at one side of the dashboard connection frame extending from the bent portion of the dashboard connection frame.

5. The vehicle cockpit module assembly of claim 1, wherein
    the linear power transmitting portion comprises a timing belt clip, and
    the fixing bracket is fastened to the one side of the main housing and inserted into the structure insertion groove of the dashboard connection frame to fasten the main housing.

6. The vehicle cockpit module assembly of claim 5, wherein, in the fixing bracket, a hole for allowing horizontal movement of the connection frame is formed.

7. The vehicle cockpit module assembly of claim 5, wherein
    a guide rail configured to guide horizontal movement of the connection frame is disposed in the fixing bracket, and
    a sliding portion configured to slide while inserted into the guide rail is disposed in the connection frame.

8. The vehicle cockpit module assembly of claim 7, wherein the connection frame includes a connection bracket comprising:
    a belt connecting member having one side inserted into the hole of the fixing bracket and connected to the timing belt clip;
    an extending member extending from one side of the belt connecting member in a direction perpendicular thereto;

a lower fixing member disposed at a longitudinal end of the belt connecting member;

a support member extending from a longitudinal end of the extending member so as to be bent to be parallel to the upper dashboard or the dashboard connection frame; and a monitor connecting member formed to be bent from a longitudinal end of the support member in a downward direction symmetrical to a gaze of a driver.

9. The vehicle cockpit module assembly of claim 8, wherein the connection frame comprises a monitor bracket, the monitor bracket comprising:

an upper connecting portion fastened to the monitor connecting member;

an extending portion extending from the upper connecting portion;

a monitor connecting portion formed in a perpendicular direction from the extending portion so as to be connected to the monitor; and a lower connecting portion extending from the monitor connecting portion so as to be fastened to the lower fixing member.

10. The vehicle cockpit module assembly of claim 9, further comprising a garnish module comprising:

an upper garnish formed to be bent inward from an end portion of the upper dashboard; and a lower garnish fastened to one side of the lower connecting portion of the monitor bracket to cover the lower dashboard.

11. The vehicle cockpit module assembly of claim 10, wherein, in the upper garnish, an insertion guide hole through which the monitor connecting member of the connection bracket passes is formed.

* * * * *